United States Patent [19]

Goto et al.

[11] Patent Number: 5,231,554
[45] Date of Patent: Jul. 27, 1993

[54] FLOATING MAGNETIC HEAD HAVING LOW NOISE LEVEL

[75] Inventors: Ryo Goto, Mooka; Masaaki Ashizawa, Tochigi, both of Japan

[73] Assignee: Hitachi Metals, Ltd., Tokyo, Japan

[21] Appl. No.: 668,039

[22] Filed: Mar. 12, 1991

[30] Foreign Application Priority Data

Mar. 13, 1990 [JP] Japan .................................. 2-61722
Mar. 13, 1990 [JP] Japan .................................. 2-61723

[51] Int. Cl.$^5$ .......................... G11B 5/60; G11B 5/48; G11B 17/32; G11B 5/127
[52] U.S. Cl. .................................. 360/103; 360/104; 360/125
[58] Field of Search ................. 360/103, 104, 119–126

[56] References Cited

U.S. PATENT DOCUMENTS

| | | | |
|---|---|---|---|
| 4,034,412 | 7/1977 | Smith | 360/103 |
| 4,389,688 | 6/1983 | Higashiyama | 360/107 |
| 4,408,238 | 10/1983 | Hearn | 360/104 |
| 4,625,249 | 11/1986 | Iwata | 360/104 |
| 4,734,805 | 3/1988 | Yamada et al. | 360/104 |
| 4,760,478 | 7/1988 | Pal et al. | 360/104 |
| 4,819,113 | 4/1989 | Kubota et al. | 360/122 |
| 4,905,111 | 2/1990 | Tuma et al. | 360/104 |
| 5,006,946 | 4/1991 | Matsuzaki | 360/103 |
| 5,027,241 | 6/1991 | Hatch et al. | 360/104 |

FOREIGN PATENT DOCUMENTS 1-248308 10/1989 Japan .
1-253803 10/1989 Japan .

OTHER PUBLICATIONS

Patent Abstracts of Japan, vol. 13, No. 120 (P-846) Mar. 24, 1989 & JP-A-63 292411 (NEC Corp).
Patent Abstracts of Japan, vol. 11, No. 399 (P-651) Dec. 26, 1987 & JP-A-62 162221 (Sumitomo Special Metals Co. Ltd).
Patent Abstracts of Japan, vol. 13, No. 309 (P-898) Jul. 14, 1989 & JP-A-01 082320 (Hitachi Metals Ltd).
Patent Abstracts of Japan, vol. 9, No. 312 (P-411) Dec. 7, 1985 & JP-A-60 140579 (Fujitsu KK).
Patent Abstracts of Japan, vol. 11, No. 129 (P-570) Apr. 23, 1987 & JP-A-61 271679 (NEC Corp).
Patent Abstracts of Japan, vol. 5, No. 113 (P-089) Nov. 13, 1981 & JP-A-56 107361.
Patent Abstracts of Japan, vol. 13, No. 392 (P-904) Jul. 25, 1989 & JP-A-01 092975 (Furukawa Electric Co., Ltd.).
Patent Abstracts of Japan, vol. 12, No. 442 (P-783) Nov. 9, 1988 & JP-A-63 157358 (NEC Corp.).

*Primary Examiner*—Stuart S. Levy
*Assistant Examiner*—Jefferson Evans

[57] ABSTRACT

A floating magnetic head having a magnetic head core incorporated in a non-magnetic slider of a cubic configuration. The core is disposed perpendicular to the plane of a magnetic disk. The core is bonded by glass to the slider at one side of the core facing the magnetic disk, and also is bonded by a resin or bonding material to the slider at the other side of the core remote from the magnetic disk. A resin or an adhesive tape is applied to the back surface of the slider, supported by a support member, at a predetermined ratio of the resin or the adhesive tape to the area of the back surface. It is effective to bond the support member to the back surface of the slider by adhesives applied to that portion of the back surface greater than the point of bonding between the support member and the back surface.

17 Claims, 6 Drawing Sheets

FLOATING MAGNETIC HEAD HAVING LOW NOISE LEVEL

BACKGROUND OF THE INVENTION

This invention relates to a floating magnetic head for use in a fixed magnetic disk device, and more particularly to a floating magnetic head of the type which produces less noise and has improved performance and reliability.

One example of a magnetic head used in a fixed magnetic disk device is a floating magnetic head of the type in which the back side of a slider is bonded to a gimbal which is held by a load arm of the cantilever type. Such a floating magnetic head is disclosed, for example, in Japanese Patent Publications JP-A-1-253803 and JP-A-1-248303.

The type of magnetic disk (serving as a magnetic recording medium) most commonly used heretofore comprises a substrate of an aluminum alloy coated with magnetic powder of oxide. Recently, in order to meet a demand for high-density recording, magnetic disks having magnetic powder coated on a substrate by plating, sputtering or other methods, have now been extensively used.

Figure 6:
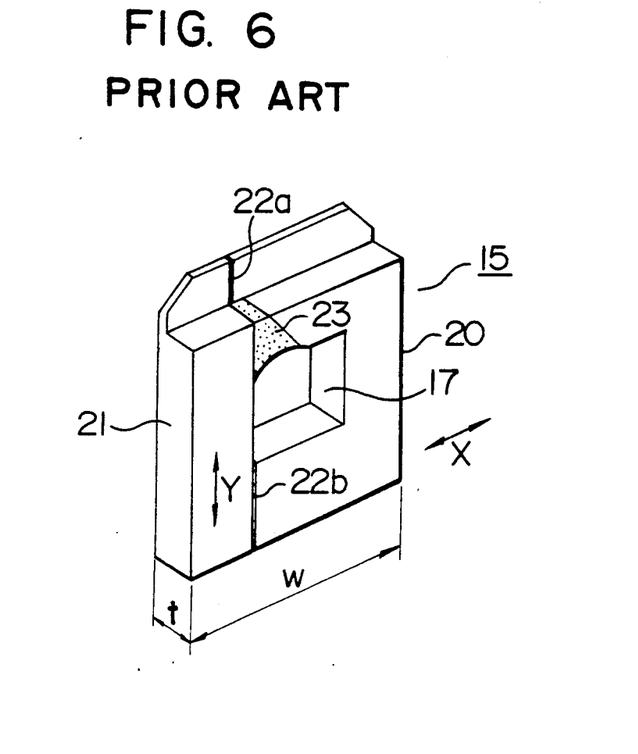
FIG. 6 is a perspective view of a magnetic head core.

A magnetic head core used in such a magnetic disk of a high coercive force comprises a pair of core pieces made of Mn-Zn ferrite having a high magnetic permeability at high frequency, the pair of core pieces being bonded together by primary glass. A magnetic head core 15 of a construction shown in FIG. 6 is also known. This magnetic head core 15 comprises an I-shaped core piece 21 made, for example, of Mn-Zn ferrite, and a C-shaped core piece 20 made, for example, of Mn-Zn ferrite as is the case with the core piece 21. The two core pieces 20 and 21 are bonded together by primary glass 23. A magnetic film 22a, 22b of an alloy, such as a Fe-Al-Si alloy, is coated on the surface of at least one of the core pieces 20 and 21 by sputtering or other method. A magnetic gap is provided between the joint portion between the core pieces 20 and 21. In the case where the alloy magnetic film is formed only on the core piece 20, a gap glass layer exists in the magnetic gap between this film and the surface of the core piece 21. In the case where the films are formed on both the core pieces 20 and 21, the gap glass exists between the two films. The magnetic head core 15 is attached to a slider 11 which is partly shown in FIG. 7 and is entirely shown in FIG. 8. The slider 11 is of a cubic shape having wide upper and lower surfaces of generally square shape. The slider 11 has a groove A opening to one side surface 24b thereof, core receiving grooves 14, 14 notched or formed in a pair of opposed walls defining the groove A, and a pair of recesses B and C formed respectively in the central portions of the upper and lower surfaces of the slider 11. The relatively high portions of the upper surface of the slider 11 remain as a result of the formation of the recess B, and the surfaces 12 and 13 of these portions are used as an air bearing surface.

Figure 11:
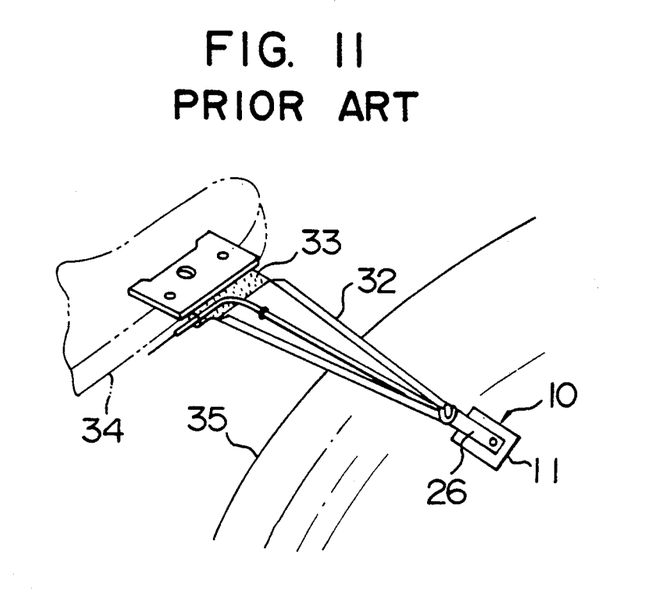
FIG. 11 is a schematic perspective view showing a conventional load arm.

The meaning of the air bearing surface is explained here. As shown in FIG. 11, an assembly 10 formed by incorporating the core 15 into the slider 11 is used with the upper surface (having the recess B) of the slider 11 disposed in facing relation to a magnetic disk 35. When the disk 35 rotates, the upper surface of the slider 11 is positioned closely to the disk 35. When the disk 35 rotates at high speed, the air on the surface of the disk 35 enters an extremely small space between the slider 11 and the disk 35 due to the viscosity of the air, and flows through this small space at high speed, and then is discharged from the small space. This air entry portion is formed by tapered surfaces 12a and 13a formed respectively on the surfaces 12 and 13, and this air discharge portion is formed by tapered surfaces 12b and 13b formed respectively on the surfaces 12 and 13. The high-velocity stream of the air in the microscopic space serves as the air bearing for floating the assembly 10 off the surface of the magnetic disk 35.

Figure 7:
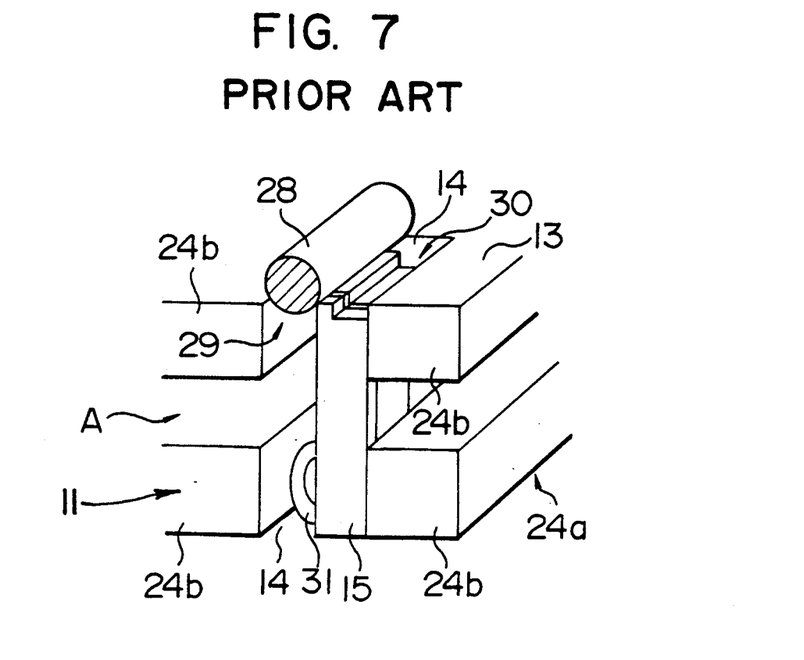
FIG. 7 is a view showing known manner of bonding a magnetic head core by secondary glass.
Figure 8:
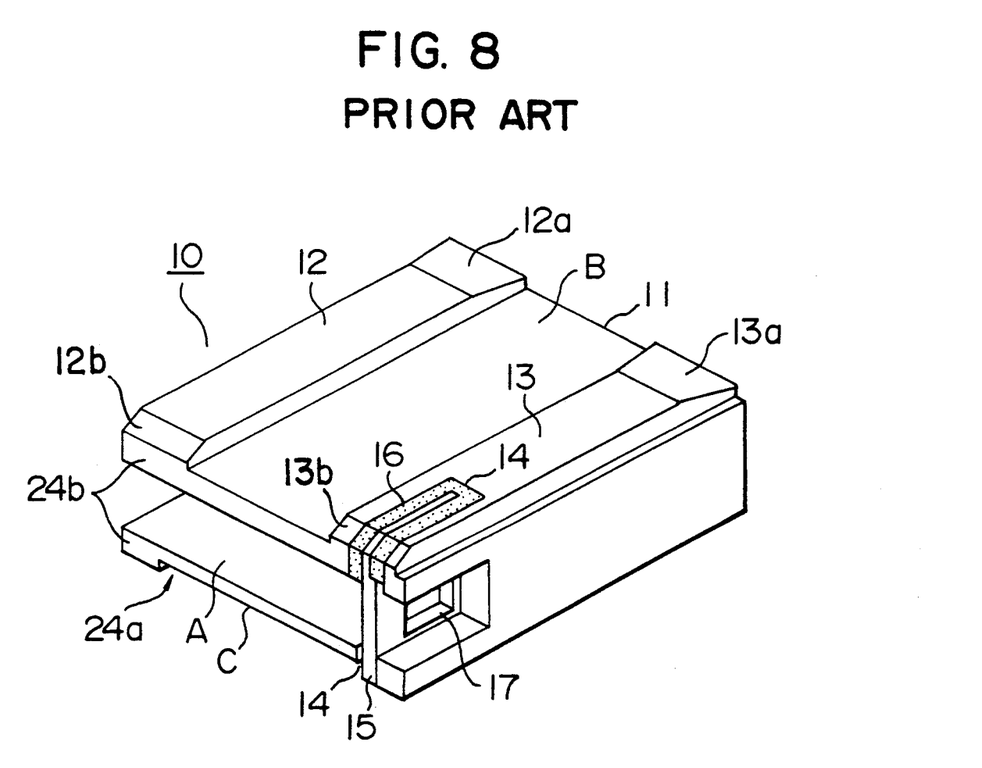
FIG. 8 is a perspective view of a conventional floating magnetic head.

Referring again to the manner of assembling the assembly 10, the magnetic head core 15 is inserted into the groove 14 provided at the air discharge side of the slider 11, and is provisionally retained by a spring member 31 (FIG. 7). In this condition, as shown in FIG. 7, a glass bar 28 is opposed to the groove 14 and is abutted against one side of the core 15 and part of the slider body. The glass bar 28 is heated to be softened into a fluid state, and flows into gaps 29 and 30 defined by the inner wall surfaces of the groove 14 and the core 15. The thus flowed glass is cured to provide a secondary glass 16 with which the core 15 is fixed to the slider 11 (FIG. 8). Then, the bearing surfaces 12 and 13 of the assembly 10 are ground and polished. Finally, a coil (not shown) is wound on the portion defining a coil hole 17, thereby providing the floating magnetic head of a construction as shown in FIG. 8.

Figure 9:
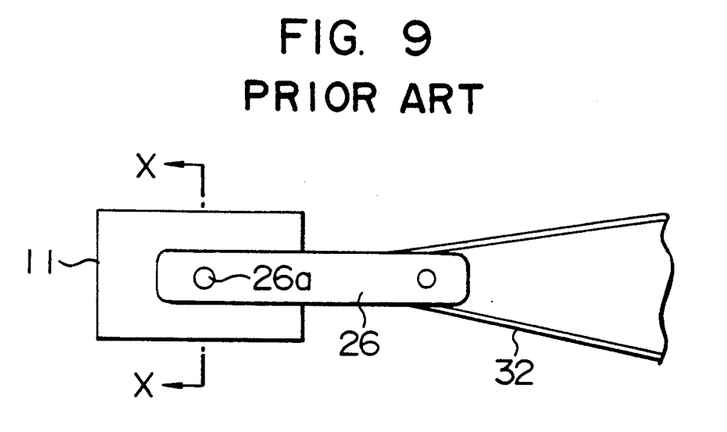
FIG. 9 is a view showing the condition of bonding between a conventional slider and a gimbal.
Figure 10:
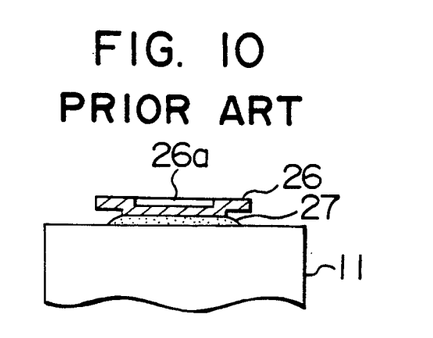
FIG. 10 is an enlarged, cross-sectional view taken along the line X—X of FIG. 9.

As shown in FIGS. 9 and 10, the slider 11 of the magnetic head is bonded to a dimple point 26a of a gimbal 26 by a bonding material 27, and the gimbal 26 is held by a load arm 32 of the cantilever type in such a manner that the slider 11 is disposed in facing relation to the disk 35. The floating magnetic head of this type (FIG. 11) has been extensively used.

In the above conventional floating magnetic head, the core pieces of Mn-Zn ferrite having a high magnetic permeability at high frequency are used, and the coating of Fe-Al-Si alloy having a high saturated flux density is used. With this arrangement, the floating magnetic head has been suited for use in the fixed disk of the high-density recording type.

However, while the high-density (i.e., large-capacity) design of the fixed magnetic disk device, as well as the compact and high-frequency design thereof, have provided further advantages, new problems to be solved have arisen. The floating magnetic head supported by the cantilever-type load arm is lightly held in contact with the disk by the force of a spring 33 (FIG. 11) when the disk is stationary; however, when the disk is moving, the air on the surface of the disk moves to produce a force to lift the slider, so that the slider floats a distance of 0.2 to 0.5 $\mu$m off the disk surface. When the disk begins to rotate and stops, the magnetic head slides over the disk. If this floating is stable, stable electromagnetic conversion characteristics can be obtained. Actually, however, the slider repeatededly upward and downward a little during these and other operations. Because of the combination of this up- and downward movement and the flow of the air caused by the rotating disk, the whole of the magnetic head is subjected to vibration. It is thought that this vibration is a kind of self-excited vibration in which the vibration itself applies energy to the magnetic head so as to gradually increase the amplitude of the vibration.

Also, such self-excited vibration may be induced by impingement of the slider upon microscopic projections on the disk during the floating of the slider.

In the conventional floating magnetic head, there is employed vibration-damping means, as disclosed in Japanese Patent Publication JP-A-63-7573, in which when the cantilever-type load arm 32 (FIG. 11) is to be fixed to a head arm 34, an adhesive tape or the like is applied to the spring 33 disposed adjacent to the proximal end of the load arm 32, thereby damping the vibration of the load arm 32. However, no measures for damping the vibration of the slider 11 per se have been adopted.

In the conventional floating magnetic head, when the magnetic head core is to be fixedly held in the groove in the air bearing portion of the slider, the magnetic head core is fixedly bonded by the secondary glass only at the front side of the magnetic head assembly adapted to face the disk, and the four side surfaces of the magnetic head core at the back or opposite side thereof (the lower side in FIG. 8) are not fixed to the inner wall surfaces of the groove, and therefore are free. In some cases, only a part of the magnetic head core is fixed to the slider at the back side thereof to such a degree as to withstand forces produced when forming the slider; however, the magnetic head core is not completely fixed to the slider at the back side thereof.

Therefore, the vibration transmitted to the magnetic head core from the slider is amplified, and the magnetic head core vibrates in a cantilever manner at a frequency different from the frequency of vibration of the slider. When the magnetic head core vibrates, it expands and contracts in directions of its height, width, etc., so that the magnetic head core is deformed. It is thought that due to this deformation, the magnetic head core of a magnetic substance undergoes a reverse magneto-striction phenomenon in which its magnetized condition differs from the initial magnetized condition. In this case, it is thought that the following condition is encountered. When such reverse magneto-striction occurs, the magnetic substance constituting the magnetic circuit is varied in magnetization distribution, so that the magnetic flux is changed in the magnetic head core. As a result, a voltage is produced through the coil, which constitutes a factor in the generation of noises, and the S-N ratio (the ratio of the output S of the magnetic head to the noise N) and the reproduced waveform are adversely affected.

Further, it is necessary to wind a coil on the portion defining the coil hole in the magnetic head core in order to generate an induction magnetic field. In numerous cases the magnetic head core is made of Mn-Zn ferrite (particularly, Mn-Zn single crystal ferrite) having good electromagnetic conversion characteristics. When applying the coil thereto, the core is possibly deformed due to the load produced when the coil is wound about 20 times on the magnetic head core held in a cantilever manner. This may result in a great possibility that the magnetic head core is subjected to a cleavage fracture in which a chipping is produced along the plane determined by a crystal structure.

SUMMARY OF THE INVENTION

It is therefore a primary object of this invention to damp the vibration of a floating magnetic head during the operation thereof.

Another object of the invention is to cushion a winding load exerted on the magnetic head core when winding a coil on the portion defining a coil hole of the magnetic head core, thereby protecting the core.

According to the present invention, there is provided a floating magnetic head comprising a slider of a nonmagnetic material held on a cantilever-type load arm via a gimbal, the slider having air bearing surfaces on a side thereof adapted to face a magnetic recording medium; a magnetic head core including a pair of magnetic core pieces which are opposed to each other via a magnetic gap and are bonded together by glass, the gloss being received in grooves at an air discharge side of an air bearing of the slider, and a portion near an edge surface of the head core adapted to face the magnetic recording medium being fixedly held by glass in one of the grooves positioned at the air bearing surface side in such a manner that the magnetic gap of the head core is disposed on the air bearing surface of the slider, and having selfexciting vibration-damping means provided between at least one of inner wall surfaces of another groove and at least one of four side surfaces of the head core at a back side thereof, the vibration-damping means being composed of an elastic material; and an exciting coil wound on a coil hole portion of the head core.

Figure 1:
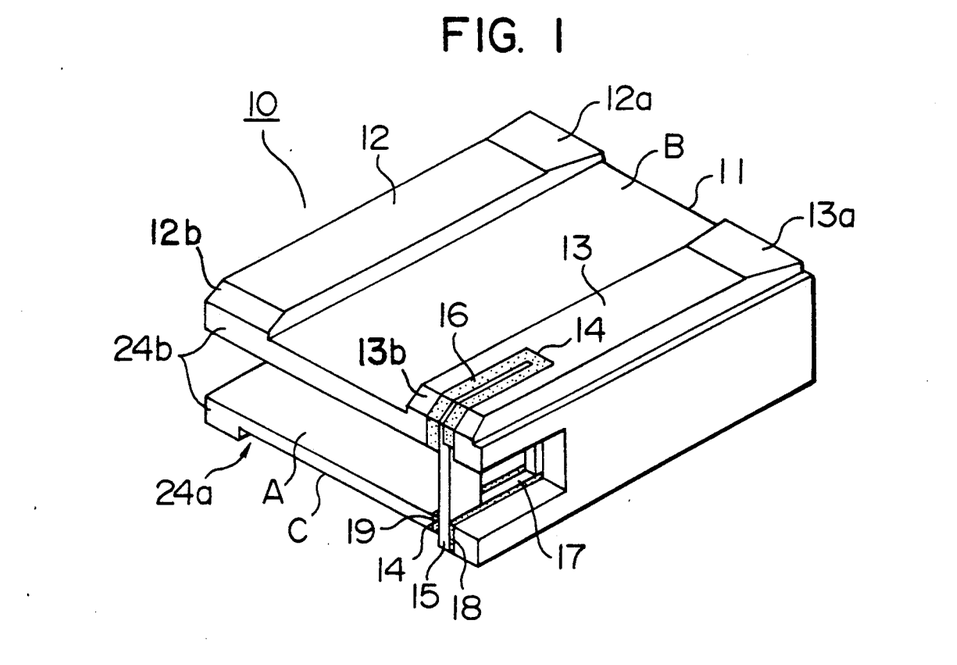
FIG. 1 is a perspective view of a floating magnetic head of the present invention in which a lower portion of a magnetic head core is fixed to a slider, and corresponds to the first and the second Examples of the invention as described below.
Figure 2:
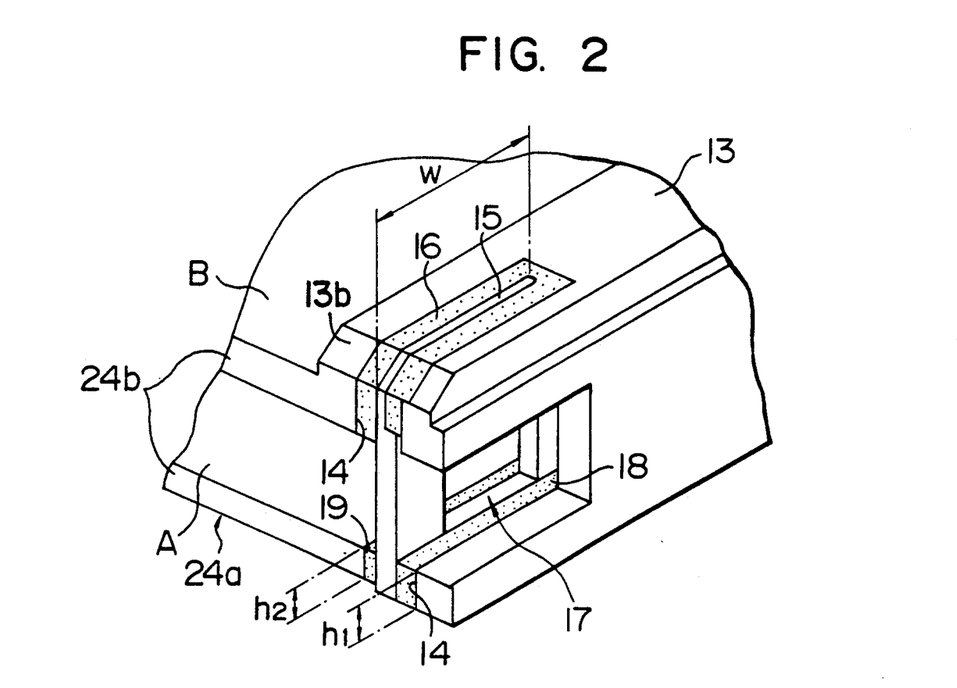
FIG. 2 is an enlarged, perspective view of a portion of the magnetic head of the present invention.
Figure 3A:
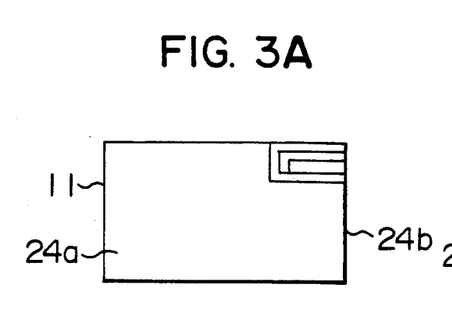
FIGS. 3A through 3H are views showing the condition in which a tape is bonded to, or a resin is coated onto a back surface of a slider, and correspond to the third Example of the invention as described below.
Figure 3B:
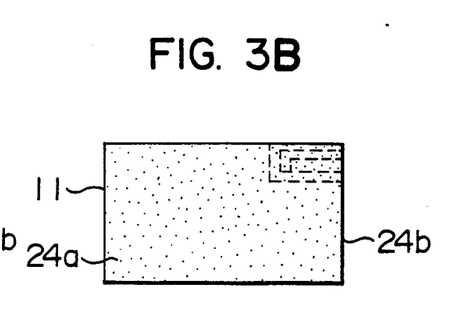
Figure 3C:
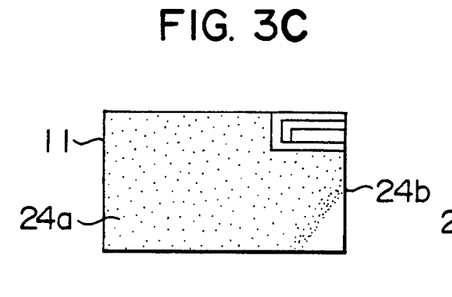
Figure 3D:
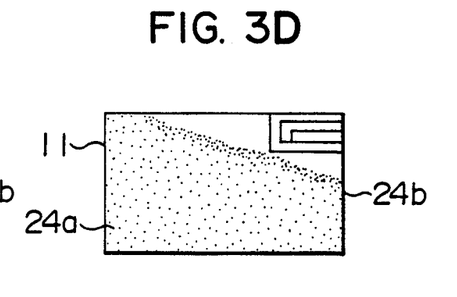
Figure 3E:
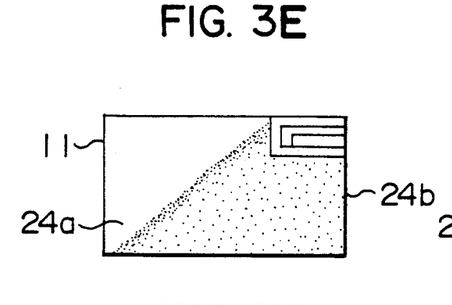
Figure 3F:
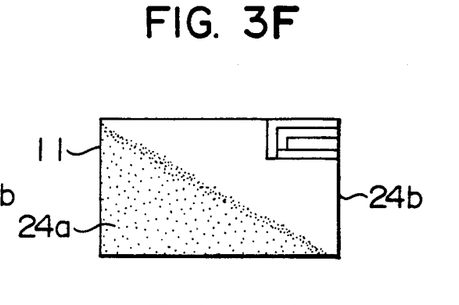
Figure 3G:
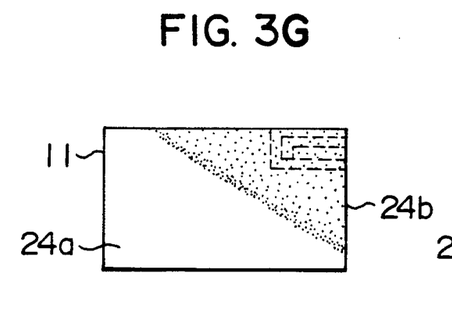
Figure 3H:
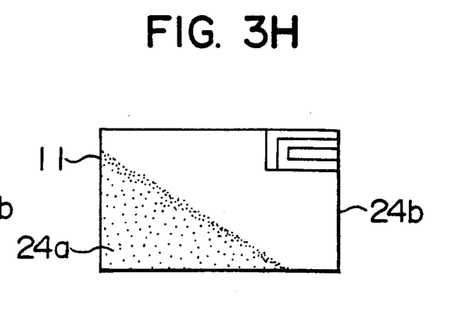
Figure 4:
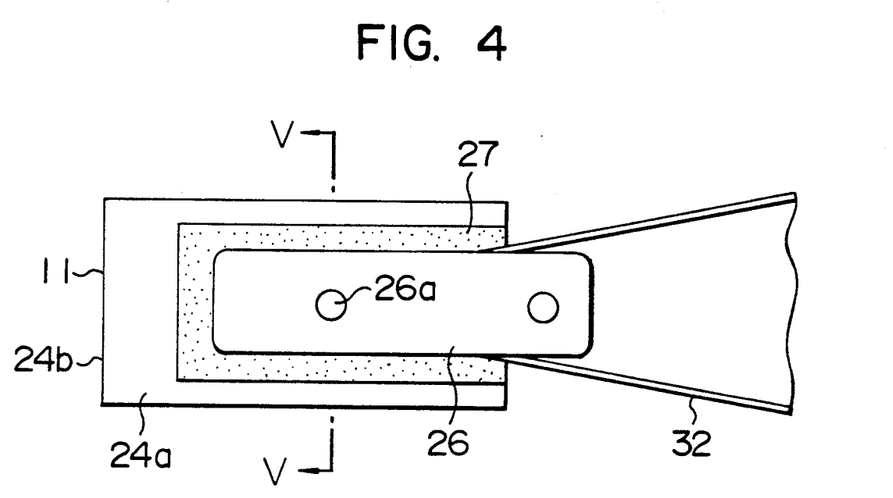
FIG. 4 is a view showing the condition of bonding between a slider and a gimbal, and corresponds to the fourth Example of the invention as described below.

In this construction, the pair of magnetic core pieces are opposed to each other via the film of bonding glass provided at the air gap. A soft magnetic metal film may be formed on the surface of at least one of the two core pieces disposed in opposed relation to the air gap. Preferably, the height of the vibration-damping means should be not less than 10% of the width (designated as w in FIG. 2) of the magnetic head core. Here, the height of the vibration-damping means and the width of the magnetic head core are defined. The magnetic head is used in a manner as shown in FIG. 11, and at this time the magnetic head core is disposed perpendicular to the plane of the magnetic disk. This perpendicular direction is the direction (Y-direction in FIG. 6) of the height of the magnetic head core, and the direction parallel to the plane of the magnetic disk is the direction (X-direction in FIG. 6) of the width of the magnetic head core. A resin or a bonding material is preferably used as the elastic material. Examples of a filler material in the resin or the bonding material comprises silica, alumina, ceramics and small pieces or powder of metal. Preferably, the filler content should be not more than 70 vol.% of the resin or the bonding material.

According to another aspect of the present invention, there is provided a floating magnetic head in which not less than 50% of the back surface of the slider is coated with an adhesive tape, a resin coating or adhesives, and not less than 50% of the back surface of the slider fixed to the gimbal is coated with a bonding material or adhesives.

In the above floating magnetic head, the pair of magnetic core pieces constituting the magnetic head core are made of Mn-Zn ferrite of either a polycrystal or a single crystal structure. With this arrangement, the magnetic head is more suited for use in a fixed magnetic disk device.

In the conventional floating magnetic head, when the magnetic head core is to be inserted into the grooves provided at the air discharge side of the air bearing of the slider, the magnetic head core is fixed by the secondary glass to the slider only at that side thereof adapted to face the disk, and the four side surfaces of the magnetic head core at the back side thereof are not completely fixed to the inner wall surfaces of the groove to be free, or is held in an almost free condition. In other words, the magnetic head core is arranged much like a cantilever-type beam or structural member having one free end and the other fixed end. On the other hand, in the floating magnetic head according to the present invention, when the magnetic head core is to be inserted into the above grooves, the magnetic head core is fixed by the secondary glass to the slider at that side thereof adapted to face the disk, and further at least one of the four side surfaces of the magnetic head core at the back side thereof is fixed by the elastic material, such as a resin and a bonding material, to the inner wall surfaces of the groove in the air bearing. Therefore, the magnetic head core can be regarded as a structural member of the type in which the side of the magnetic core adapted to face the disk is fixed whereas the opposite or back side of the magnetic core is restrained by the elastic material such as a resin, a bonding material (or adhesives) and the like. Therefore, even when the vibration of the slider propagates to the magnetic head core, the vibration is absorbed and damped by the elastic material provided at the back side of the magnetic head core. The resulting deformation is limited by the elastic material in contrast with the case where the back side is free, and therefore such deformation is much less than that of the conventional magnetic head core. As a result, the resulting reverse magneto-striction is small, and the performance and reliability of the magnetic head can be improved.

Since the back side is restrained by the elastic material, the deformation produced when applying the coil is also small, and in the case where the magnetic core is made of Mn-Zn single crystal ferrite, the possibility of cleavage fracture produced when applying the coil is reduced.

The reason why the upper limit of the filler content of the resin or the bonding agent is limited to not more than 70 vol.% is that if the filler content exceeds 70 vol.%, the ability of absorbing vibration is lowered, so that the level of produced noises becomes extremely high. The lower limit is not particularly defined, but desirable results are obtained with not less than 20 vol.% of the filler content.

The reason why the bonding height (see $h_1$, and $h_2$ in FIG. 2) of the resin or the bonding material is not less than 10% of the width (see w in FIG. 2) of the magnetic head core is that if it is less than 10%, the vibration propagating from the slider to the magnetic head core can not be sufficiently absorbed, so that the level of produced noises becomes extremely high. The upper limit of the bonding height is not particularly defined, as is the case with the lower limit of the filler content, but it appears that its effect is saturated with about 70%.

In the floating magnetic head, when the slider is to be bonded to the gimbal, not less than 50% of the area of the back surface of the slider is covered with an adhesive tape or a coated resin, or not less than 50% of the back surface area of the slider bonded to the gimbal is coated with a bonding material. With this arrangement, the vibration of the slider per se is damped.

Therefore, the amplitude of the vibration of the slider per se is smaller as compared with the type of magnetic head having no measures for damping the vibration of the slider. Moreover the generation of self-excited vibration can be prevented. As a result, if the magnetic head core is embedded in the grooves in the air bearing portion, and is fixed by the secondary glass only at that side thereof adapted to face the disk with the back side of the magnetic head core being free, the vibration propagating from the slider is small. Therefore, even when the amplitude of the vibration is amplified and also when the magnetic head core vibrates in a cantilever manner at a frequency different from that of the slider, the deformation developing in the directions of the height, width, etc., of the core is very much smaller than the deformation of the convention magnetic head core. As a result, the resulting reverse magneto-striction is small, thereby improving the performance and reliability of the magnetic head.

DESCRIPTION OF THE PREFERRED EMBODIMENTS

A pair of core pieces 20 and 21 (see FIG. 6) were prepared from Mn-Zn single crystal ferrite consisting essentially of 28 mol.% MnO, 19 mol.% ZnO and the balance $Fe_2O_3$. A Fe-Al-Si type magnetic film of an alloy commonly referred to as Sendust alloy consisting of 6 wt.% Al, 8 wt.% Si and the balance being essentially Fe was coated by sputtering on that surface of the I-shaped core piece 21 facing the magnetic gap. Then, the I-shaped core piece 21 was bonded to the C-shaped core piece 20 by primary glass 23 to form a magnetic head core 15. Then, this core was inserted into upper and lower grooves 14, 14 formed in an air discharge side of air bearing surfaces 12 and 13 of a slider 11 made of $CaTiO_3$, and that side of the magnetic head core 15 adapted to face a disk is fixed to the slider by secondary glass 16 to prepare a floating magnetic head. The condition of generation of noises was examined.

A method of measuring noises was to forcibly apply vibration to the slider from the exterior and then to stop the application of the vibration. From the time when the application of the vibration was stopped, the vibration of the slider per se began to be damped. Defining the time of stopping the application of the vibration as a start time point, a single noise generated only from the magnetic head was picked up through a reproduction circuit of the magnetic disk device, and its waveform was observed by an oscilloscope.

EXAMPLE 1

Magnetic head cores, each core fixedly held in the grooves 14 in the slider 11, were adhesively bonded at the back side thereof, with the height of bonding between the back side of the magnetic head core and the groove 14 changed variously, and a coil was wound on the portion defining a coil hole 17 of the magnetic head core 15. Then, a noise generation test was carried out. As bonding material 18 and 19, there was used Allonalpha #2000S (trade-name of Toha Synthetic Chemical Industry Co., Ltd.) an instantaneous adhesive of a cyanoacrylate type, and the filler content of the bonding material was constant, that is, 50 vol.%. With respect to the bonding at the back side, there were tested three kinds of bonding, that is, the bonding at one side surface in the direction of the width w, the bonding at two side surfaces in the direction of the width w (see, e.g., FIG. 2), and the bonding at the two side surfaces in the direction of the width w and at one side surface in the direction of the thickness t. The bonding was carried out in accordance with the standard of use of Allonalpha. Results thereof are shown in Table 1.

It will be appreciated from Table 1 that those magnetic heads in which the sum of the heights (see, e.g., $h_1$ and $h_2$ in FIG. 2) of the bonding surfaces is not less than 10% of the width w of the magnetic head core are clearly reduced in relative noise level as compared with the magnetic head having no bonding. However, a comparison between 40% and 70% indicates that the two magnetic heads are substantially equal in noise level to each other. Therefore, it can be concluded that the bonding up to 70% is sufficient to achieve the purpose of reduced noise level.

TABLE 1

| Sample No. | Height of bonding surface | Noise level |
| --- | --- | --- |
| 1 | no bonding | 100 |
| 2 | 5% | 80 |
| 2a | 5% | 70 |
| 3 | 10% | 40 |
| 3a | 10% | 40 |
| 4 | 20% | 35 |
| 5a | 40% | 30 |
| 6 | 70% | 30 |

With respect to Sample Nos. 2, 3 and 4, one of the two side surfaces in the direction of the core width was bonded. With respect to Sample Nos. 2a, 3a and 5a, the two side surfaces in the direction of the core width were bonded. With respect to Sample No. 6, the two side surfaces in the direction of the core width and one side surface in the direction of the core thickness were bonded. The height of the bonding surface represents the ratio of the bonding height to the core width. The noise level represents the value relative to the value (100) of the magnetic head having no bonding.

EXAMPLE 2

Using Able-bond 410 (trade-name of Nippon Ablestick Co., Ltd), an epoxy adhesive, usually used for assembling the slider, the two side surfaces of each of magnetic head cores at the back side thereof were bonded to the air bearing groove in such a manner that the height of the bonding was generally 40% of the core width. Then, a coil was wound on the portion defining the coil hole. Then, the noise level was examined. Results thereof are shown in Table 2.

TABLE 2

| Sample No. | Filler content | Noise level |
| --- | --- | --- |
| 1 | no bonding | 100 |
| 2 | 20 vol. % | 25 |
| 2a | 20 vol. % | 20 |
| 3 | 50 vol. % | 20 |
| 4 | 60 vol. % | 30 |
| 5 | 70 vol. % | 45 |
| 5a | 70 vol. % | 40 |
| 6 | 80 vol. % | 80 |

With respect to Sample Nos. 2, 3, 4, 5 and 6, one of the two side surfaces in the direction of the core width was bonded. With respect to Sample Nos. 2a and 5a, both of these two side surfaces were bonded. The noise level represents the value relative to the value (100) of the magnetic head having no bonding.

As is clear from Table 2, the relative noise level of those magnetic heads with the adhesive having the filler content of up to 70 vol.% is reduced to less than 50 vol.% as compared with the magnetic head whose core was not bonded at its back side. However, it will be appreciated that when the filler content exceeds 80%, the damping effect is extremely lowered.

In the Examples, although two kinds of adhesives (i.e., Allonalpha and Able-bond) are used as the resin or the bonding agent, similar effects can be expected with the use of any other suitable resin and bonding agent.

EXAMPLE 3

An adhesive tape was bonded to a back surface 24a of the slider 11 of the magnetic head, or an epoxy resin was coated on the back surface 24a of the slider 11. A coil was applied to the slider, and the slider was attached to a gimbal 26. Then, the gimbal was held by a load arm, and the condition of generation of noises was examined. The bonding of the adhesive tape to the back surface of the slider, as well as the coating of the epoxy resin on the back surface 24a of the slider, was carried out, varying the rate of coverage of the area of the back surface 24a with the adhesive tape or the coated resin 25, as shown in FIGS. 3A through 3H. Influences due to the change in the area coverage rate were examined. Results thereof are shown in Table 3.

TABLE 3

| Sample No. | Area coverage rate | Noise level |
| --- | --- | --- |
| 1 | no treatment | 100 |
| 2 | 100% | 20 |
| 3a | 90% | 20 |
| 4a | 80% | 25 |
| 5 | 65% | 35 |
| 6 | 50% | 40 |
| 7 | 40% | 70 |
| 8a | 30% | 80 |

With respect to Sample Nos. 2, 5, 6 and 7, the adhesive tape was bonded. With respect to Sample Nos. 3a, 4a and 8a, the resin was coated. The noise level represents the value relative to the value (100) of the magnetic head subjected to no treatment. The area coverage rate represents the ratio of the covering tape or the covering resin to the entire area of the back surface 24a of the slider.

As is clear from Table 3, the relative noise level can be reduced to less than 50% by covering not less than 50% of the area of the slider back surface with the adhesive tape or the coated resin. Particularly when the area coverage ratio is not less than 80%, the noise level is extremely reduced.

Incidentally, the front surface or the entire side surfaces of the slider were covered with the tape or the resin, and similar tests were conducted. However, the relative noise level was 100 in the former case, and was 70 in the latter case. Thus, effects were hardly achieved. This is presumably due to the fact that the vibration of the load arm propagates to the slider via the gimbal holding it, so that the degree of damping between the slider and the gimbal is small.

EXAMPLE 4

Figure 5:
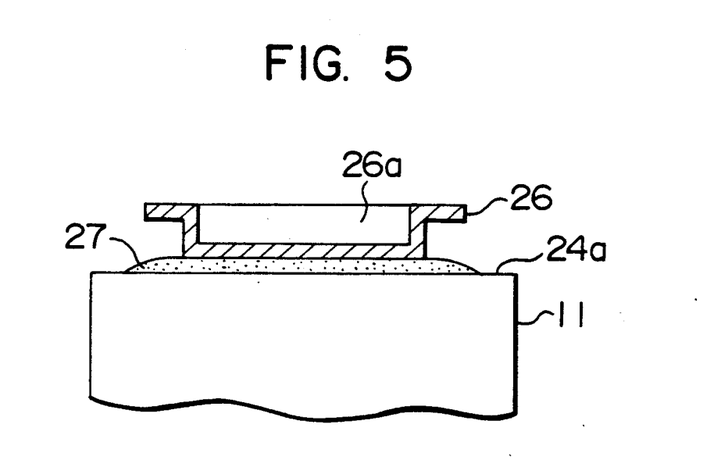
FIG. 5 is a cross-sectional view taken along the line V—V of FIG. 4.

A magnetic head as shown in FIG. 5 was prepared, and an adhesive 27 for bonding the gimbal 26 and the slider 11 was coated not only on the normal bonding portion (see a dimple point 26a) of the back surface 24a of the slider 11 but also on the other portion than this normal bonding portion. The rate of coverage of the area by the adhesive was varied, and the noise level was examined. Results thereof are shown in Table 4.

TABLE 4

| Sample No. | Area coverage rate | Noise level |
| --- | --- | --- |
| 1 | Normal | 100 |
| 2 | 30% | 90 |
| 3 | 40% | 60 |
| 4 | 50% | 40 |
| 5 | 70% | 25 |
| 6 | 80% | 20 |
| 7 | 100% | 20 |

The noise level represents the value relative to the value (100) of the magnetic head having the adhesive coated only on the normal portion. The area coverage rate represents the ratio of the covering adhesive to the entire area of the back surface 24a of the slider.

As is clear from Table 4, as compared with the magnetic head having the adhesive coated only on the normal portion of the slider back surface, the relative noise level of those magnetic heads having the adhesive covering not less than 50% of the entire area of the slider back surface is reduced to less than 50%. Particularly when the area coverage rate is not less than 70%, the noise level is reduced markedly.

In the above Examples, the adhesive tape, the coated or bonded epoxy resin were used; however, if the tape or the resin has a thickness of at least 10 μm, the intended effects can not be achieved. The upper limit of the thickness of the tape or the resin is about 200 μm, because this upper limit influences the weight of the slider.

In the above Examples, although the magnetic core head is made of Mn-Zn single crystal ferrite by way of example, it may be made of polycrystal ferrite, and also may be made of any other magnetic material. The present invention can be applied to the magnetic head having no metal magnetic film or coating.

As will be apparent from the above Examples, the magnetic heads of the present invention, even when used in a high-density, large-capacity, compact and high-frequency fixed disk, produce less noise due to the reverse magneto-striction presumably caused by the vibration transmitted from the slider, and the S-N ratio (the ratio of the output S of the magnetic head to the noise N) is small, and the magnetic heads of the invention can produce good reproduction waveforms. Thus, the performance and the reliability of the magnetic head of the invention are improved.

What is claimed is:

1. A floating magnetic head comprising:
   a cantilever-type load arm;
   a slider of a non-magnetic material held on the cantilever-type load arm, the slider having a first side which forms air bearing surfaces and is adapted to face a magnetic recording medium, and having a first groove opening to a second slider side at an air discharge end of the slider, wherein said second side is generally perpendicular to said first side;
   a magnetic head core including a pair of magnetic core pieces which are opposed to each other via a magnetic gap and are bonded together by glass and which are received in second and third grooves at the air discharge end of the slider, wherein said second and third grooves are formed to intersect said first groove in a generally perpendicular manner; and an end portion of said head core being adapted to face the magnetic recording medium and fixedly held by glass within said second groove in such a manner that the magnetic gap of the head core is disposed on the air bearing surfaces of the slider, and an elastic, vibration-damping material fixing at least one side surface of an opposite end portion of the magnetic head core to an inner wall surface of said third groove the elastic material having a height in a direction generally parallel to said second side and generally perpendicular to said air-bearing surfaces not less than 10% of a width of the head core in a direction generally perpendicular to said second side and generally parallel o said air-bearing surfaces; and
   an exciting coil wound on a coil hole portion of the head core.

2. A floating magnetic head according to claim 1 wherein at least one of the pair of magnetic core pieces has a magnetic metal film. formed in a surface thereof opposed to the magnetic gap.

3. A floating magnetic head according to claim 2 wherein the film is a Fe-Al-Si type magnetic alloy film consisting of 6 wt.% of Al, 8 wt% of Si and the balance being essentially Fe.

4. A floating magnetic head according to claim 2, wherein the pair of magnetic bore pieces are made of single crystal of Mn-Zn ferrite.

5. A floating magnetic head according to claim 1, wherein the pair of magnetic core pieces are made of single crystal of Mn-Zn ferrite.

6. A floating magnetic head according to claim 1 wherein the elastic material is a resin.

7. A floating magnetic head according to claim 6, wherein the elastic material has a content of a filler of not more than 70 vol.%.

8. A floating magnetic head according to claim 1 wherein the elastic material is a bonding material.

9. A floating magnetic head according to claim 8, wherein the elastic material has a content of a filler of not more than 70 vol.%.

10. A floating magnetic head according to claim 1, wherein the elastic material has a content of a filler of not more than 70 vol.%.

11. A floating magnetic head according to claim 10, wherein at least one of the pair of magnetic core pieces has a magnetic metal film formed on a surface thereof opposed to the magnetic gap.

12. A floating magnetic head according to claim 10, wherein the pair of magnetic core pieces are made of single crystal of MnZn ferrite.

13. A floating magnetic head according to claim 12, wherein at least one of the pair of magnetic core pieces has a magnetic metal film formed on a surface thereof opposed to the magnetic gap.

14. A floating magnetic head according to claim 1, wherein two side surfaces at the opposite end portion of the head core along the width of the head core was fixed by the elastic material.

15. A floating magnetic head according to claim 1, wherein two side surfaces at the opposite end portion of the head core along the width of the head core and one side surface of the head core along the thickness of the head core are fixed by the elastic material.

16. A floating magnetic head according to claim 1, wherein one side surface at the opposite end portion of the head core along the thickness of the head core is fixed by the elastic material.

17. A floating magnetic head according to claim 1, wherein one side surface at the opposite end portion of the head core along the width of the head core is fixed by the elastic material.

* * * * *

UNITED STATES PATENT AND TRADEMARK OFFICE
CERTIFICATE OF CORRECTION

PATENT NO. : 5,231,554
DATED : JULY 27, 1993
INVENTOR(S) : RYO GOTO ET AL.

It is certified that error appears in the above-identified patent and that said Letters Patent is hereby corrected as shown below:

Col. 3,   line 52, "cases" should be --cases,--.

Col. 4,   line 10, "gloss" should be --glass--.

Col. 5,   line 64, "Moreover" should be --Moreover,--.

Col. 6,   line 30, "magnetic" should be --known magnetic--.

Col. 7,   line 14, "Ltd.)," should be --Ltd.),--;
          line 63, "Ltd)," should be --Ltd.),--.

Signed and Sealed this

Twentieth Day of September, 1994

Attest:

BRUCE LEHMAN

*Attesting Officer*    *Commissioner of Patents and Trademarks*